(12) United States Patent
Gautrot et al.

(10) Patent No.: US 11,143,094 B2
(45) Date of Patent: Oct. 12, 2021

(54) GAS INLET DEVICE WITH INTERSECTION OF THE INLET DUCT AND THE VALVE CALIBRATION INCLINED WITH RESPECT TO THE FIRE FACE

(71) Applicant: IFP Energies nouvelles, Rueil-Malmaison (FR)

(72) Inventors: Xavier Gautrot, Rueil-Malmaison (FR); Julien Trost, Rueil-Malmaison (FR); Martin Ritter, Rueil-Malmaison (FR); Christophe Lechard, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 17/052,615

(22) PCT Filed: Mar. 20, 2019

(86) PCT No.: PCT/EP2019/056930
§ 371 (c)(1),
(2) Date: Nov. 3, 2020

(87) PCT Pub. No.: WO2019/211040
PCT Pub. Date: Nov. 7, 2019

(65) Prior Publication Data
US 2021/0239035 A1 Aug. 5, 2021

(30) Foreign Application Priority Data

May 4, 2018 (FR) ..................................... 18/53.856

(51) Int. Cl.
*F02B 3/00* (2006.01)
*F02B 31/06* (2006.01)
(Continued)

(52) U.S. Cl.
CPC .............. *F02B 31/06* (2013.01); *F02M 61/14* (2013.01); *F02B 2031/006* (2013.01); *F02B 2275/32* (2013.01); *F02B 2275/48* (2013.01)

(58) Field of Classification Search
CPC ............ F02B 2075/125; F02B 2275/48; F02B 2023/106; F02F 1/4214; F02F 2001/245
(Continued)

(56) References Cited

U.S. PATENT DOCUMENTS 4,465,034 A * 8/1984 Tsutsumi ................ F02B 31/06
123/306
5,056,486 A 10/1991 Johannes
(Continued)

FOREIGN PATENT DOCUMENTS

DE 10128500 C1 2/2003
EP 1783341 A1 5/2007
(Continued)

OTHER PUBLICATIONS

International Search Report for PCT/EP2019/056930, dated Apr. 10, 2019; English translation submitted herewith (7 pgs.).

*Primary Examiner* — Long T Tran
*Assistant Examiner* — James J Kim
(74) *Attorney, Agent, or Firm* — Fitch, Even, Tabin and Flannery

(57) ABSTRACT

The present invention relates to a gas intake device (1) for a cylinder of an internal-combustion engine. Gas intake device (1) comprises an intake pipe (2), an intake valve (3), a calibration part (4) for intake valve (3), and means for generating an aerodynamic motion of the gas in the cylinder about an axis substantially perpendicular to the axis of said cylinder. Furthermore, intersection (7) between intake pipe (2) and calibration part (4) occurs in a line nonparallel to the plane of fire face (FF).

13 Claims, 3 Drawing Sheets

(51) Int. Cl.
*F02M 61/14* (2006.01)
*F02B 31/00* (2006.01)

(58) Field of Classification Search
USPC .......................................................... 123/294
See application file for complete search history.

(56) References Cited

U.S. PATENT DOCUMENTS

| | | | | |
|---|---|---|---|---|
| 5,709,190 | A * | 1/1998 | Suzuki | F02B 23/104 |
| | | | | 123/302 |
| 6,253,729 | B1 * | 7/2001 | Suzuki | F02B 31/08 |
| | | | | 123/302 |
| 6,606,975 | B1 | 8/2003 | Caliskan et al. | |
| 7,188,604 | B2 * | 3/2007 | Isaji | F02D 9/103 |
| | | | | 123/337 |
| 2007/0119421 | A1 * | 5/2007 | Lewis | F01N 11/007 |
| | | | | 123/431 |
| 2011/0283974 | A1 * | 11/2011 | Baeuerle | F02M 69/044 |
| | | | | 123/472 |
| 2018/0010486 | A1 * | 1/2018 | Yoshihara | F02D 13/0261 |

FOREIGN PATENT DOCUMENTS

| | | | |
|---|---|---|---|
| FR | 2780093 | A3 | 12/1999 |
| FR | 2902464 | A1 | 12/2007 |
| WO | 99/22125 | A1 | 5/1999 |
| WO | 01/94770 | A1 | 12/2001 |

* cited by examiner

Art antérieur

GAS INLET DEVICE WITH INTERSECTION OF THE INLET DUCT AND THE VALVE CALIBRATION INCLINED WITH RESPECT TO THE FIRE FACE

CROSS-REFERENCE TO RELATED APPLICATIONS

This application is a U.S. national phase application filed under 35 U.S.C. § 371 of International Application No. PCT/EP2019/056930, filed Mar. 20, 2019, designating the United States, which claims priority from French Patent Application No. 18/53.856, filed May 4, 2018, which are hereby incorporated herein by reference in their entirety.

FIELD OF THE INVENTION

The present invention relates to the field of gas intake devices for an internal-combustion engine. In particular, the present invention relates to gas intake devices allowing to generate an aerodynamic gas motion in the engine cylinder.

This type of engine generally comprises at least one cylinder, a piston sliding in this cylinder in a reciprocating rectilinear motion, intake means for an oxidizer, burnt gas exhaust means, a combustion chamber and injection means for injecting a fuel.

As is generally admitted, upon design of an engine, the performance and pollutant emission constraints are increasingly high, therefore new solutions need to be found to increase the final engine efficiency.

Increasing the combustion efficiency thus is a key point to limit emissions for equal or greater performance. It is therefore of great importance that all of the fuel present in the combustion chamber be used by an oxidizer comprising for example air at ambient pressure, supercharged air, or a mixture of air (supercharged or not) and of recirculated burnt gas.

Indeed, the fuel mixture (oxidizer/fuel) in the combustion chamber needs to be as homogeneous as possible.

Furthermore, in order to ensure good efficiency and combustion rate, it is desirable to have a high turbulence level, and more specifically a high turbulent kinetic energy level, upon ignition of the fuel mixture and during the subsequent combustion.

This high turbulence level can be reached by means of particular intake aerodynamics known as swumble. This type of aerodynamics is characterized in that the macroscopic motion of the fuel mixture is a combination of swirl (rotational motion of the gas in the cylinder about a vertical cylinder axis) and tumble (rotational motion of the gas in the cylinder about a longitudinal engine axis).

Swirl, which is a macroscopic rotational motion of the fuel mixture about an axis collinear to the cylinder axis, is characterized by good motion conservation during the intake process, and more specifically during the rise of the piston. It is an aerodynamic macroscopic motion that is generally used for compression-ignition internal-combustion engines for which it is a good way to homogenize the fuel mixture.

Tumble is also a macroscopic rotational motion of the fuel mixture, but about an axis globally perpendicular to the cylinder axis. It has the specific feature of turning into microscopic aerodynamic motions that create turbulence as the piston rises. It is an aerodynamic macroscopic motion that is generally used for spark-ignition internal-combustion engines for which it is a good way to obtain a suitable combustion rate. Besides, this motion is quite sensitive to the combustion chamber geometry and to the lift law, in terms of spread as well as maximum lift height.

Using swumble allows to benefit from the advantages of the two aerodynamic structures detailed above and thus from excellent homogenization and a better combustion rate, thanks to a higher turbulence level during the intake phase than the levels observed with the best current spark-ignition engines.

BACKGROUND OF THE INVENTION

Various technical solutions have been developed to achieve these turbulent flows in the cylinder.

A first solution is notably described in U.S. Pat. No. 6,606,975. This solution consists in controlling a flap arranged in the intake pipe so as to generate turbulence. This patent also mentions the notion of swumble at low loads. Such a solution is complex and penalizing as regards cylinder filling.

A second solution is notably described in U.S. Pat. No. 5,056,486. This solution provides a definition of asymmetrical intake pipes allowing complex aerodynamics to be generated. However, this solution requires phase shifting the opening of the intake valves, which is penalizing at high loads.

A third solution is notably described in patent applications DE-10,128,500 and EP-1,783,341. This solution allows complex aerodynamics to be generated by means of passive or active appendages in the intake pipe. In both cases, these appendages limit cylinder filling with gas. Furthermore, active appendages require a control system making the solution more complex.

To overcome these drawbacks, the present invention relates to a gas intake device for a cylinder of an internal-combustion engine. The gas intake device comprises an intake pipe, an intake valve, an intake valve calibration part, and means for generating an aerodynamic tumble type motion of the gas in the cylinder. Furthermore, the intersection between the intake pipe and the calibration part occurs in a line nonparallel to the plane of the fire face. This inclination allows to generate an aerodynamic swirl type motion in the cylinder, which combines with the tumble so as to generate an aerodynamic swumble type motion.

SUMMARY OF THE INVENTION

The present invention relates to a gas intake device for a cylinder of an internal-combustion engine, said gas intake device comprising an intake pipe, at least one intake valve arranged within said intake pipe, at least one calibration part for said intake valve arranged at one end of said intake pipe and directed at the fire face of said cylinder, and means for diverting said gas so as to generate an aerodynamic motion of said gas within said cylinder about an axis substantially perpendicular to the axis of said cylinder. At the intrados of said intake pipe, the intersection between said intake pipe and said calibration part of said intake valve is on a generatrix forming an angle α ranging between 5° and 45° with respect to a plane parallel to said fire face of said cylinder passing through a point of intersection between said intake pipe and said calibration part.

According to an embodiment, said angle α ranges between 10° and 20°, preferably between 13° and 17°.

According to an implementation of the invention, said means for diverting said gas consist of the shape of said intake pipe.

According to an aspect, said means for diverting said gas comprise a ramp shape on the lower profile of said intake pipe.

Advantageously, said means for diverting said gas comprise a convergence of the flow cross-section of said intake pipe near said calibration part of said valve.

Advantageously, said means for diverting said gas comprise an inclination of said intake pipe defined by an angle β of tangent to the point of intersection of said intake pipe with said calibration part ranging between 0° and 45°.

According to a feature, said intake pipe comprises two gas outlets opening into said cylinder and two intake valves.

Furthermore, the invention relates to an internal-combustion engine comprising at least one cylinder provided with at least one intake device according to one of the above features, at least one exhaust device and fuel injection means.

According to an embodiment, said fuel injection means are arranged in said cylinder.

According to an implementation, said fuel injection means are arranged in said intake device.

Furthermore, the invention relates to the use of an internal-combustion engine according to one of the above features for a Miller cycle or an Atkinson cycle.

BRIEF DESCRIPTION OF THE FIGURES

Other features and advantages of the device according to the invention will be clear from reading the description hereafter, given by way of non limitative example, with reference to the accompanying figures wherein.

DETAILED DESCRIPTION OF THE INVENTION

Figure 1:
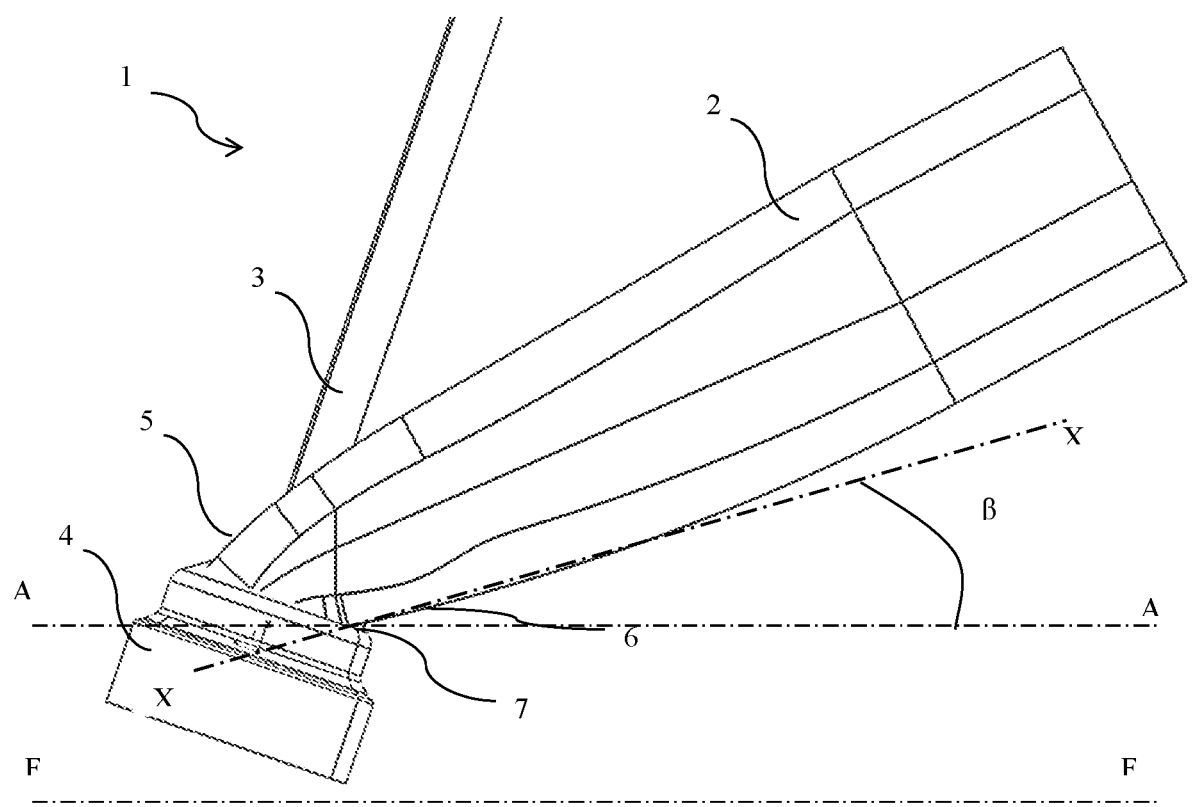
FIG. 1 illustrates a gas intake device according to an embodiment of the invention in a side view.

The present invention relates to a gas intake device for a cylinder of an internal-combustion engine.

The gas intake device comprises:
- a gas intake pipe for supplying gas to a cylinder,
- an intake valve inserted in the intake pipe, opening of the valve allowing gas to be supplied to the cylinder,
- an intake valve calibration part arranged at the end of the intake valve on the cylinder side, the calibration part being directed at the fire face of the cylinder, the intake valve calibration part being a substantially cylindrical mechanical part in which the valve moves, and
- gas diversion means for generating an aerodynamic motion of the gas within the cylinder in a direction perpendicular to the cylinder axis, in other words, means for generating an aerodynamic tumble type motion of the gas.

The fire face or combustion face is understood to be the lower plane of the cylinder head (of the internal-combustion engine) orthogonal to the cylinder axis. The valve calibration part is inserted in the lower plane of the cylinder head so as to supply gas to the cylinder.

According to the invention, the intake device is formed in such a way that, at the intrados of said intake pipe, the intersection between the intake pipe and the valve calibration part is on a generatrix forming an angle α ranging between 5° and 45°, with respect to a plane parallel to the fire face and passing through a point of intersection between the intake pipe and the valve calibration part. The intrados of the intake pipe is understood to be the lower face of the intake pipe. Thus, the intersection of the lower face of the intake pipe with the valve calibration part is inclined with respect to a plane parallel to the fire face. This inclination allows the gas to be diverted at the calibration part inlet and, a fortiori, at the cylinder inlet. This gas diversion generates an aerodynamic gas motion in the cylinder, in a direction parallel to the cylinder axis, in other words, an aerodynamic swirl type gas motion. This inclination can result in a rotation of the intake pipe at the end thereof (the end of the intake pipe is then twisted), which promotes aerodynamic swirl type motion of the gas. Furthermore, this embodiment allows to generate an aerodynamic swirl type motion of the gas without any particular appendage of mask, flap or blade type. Moreover, the architecture of these intake devices involves no additional constraint for arrangement within a cylinder head of a single-cylinder or multi-cylinder internal-combustion engine.

The inclination at an angle α ranging between 5° and 45° allows an aerodynamic swirl type motion of the gas to be generated. Below 5°, the inclination is insufficient to provide a significant influence on the aerodynamic motion of the gas in the cylinder. Above 45°, the geometry of the intake pipe is complex and difficult to achieve.

By combining aerodynamic gas motions of tumble type and of swirl type, the gas intake device according to the invention provides an aerodynamic swumble type motion of the gas in the cylinder, which allows to benefit from excellent homogenization and a better combustion rate thanks to a higher turbulence level during the compression phase than those observed with the best current spark-ignition engines.

The gas is an oxidizer or a fuel mixture (indirect injection), and it can notably comprise air at ambient pressure, supercharged air, or a mixture of air (supercharged or not) and burnt gas.

According to an embodiment of the invention, angle α can range between 10° and 20°, preferably between 13° and 17°. These angle ranges allow to optimize the aerodynamic swirl type motion of the gas, and thus to optimize the combined aerodynamic swumble type motions of the gas.

According to an implementation of the invention, the gas diversion means only consist of the shape of the intake device. Thus, no active or passive element hinders passage of the gas through the intake pipe.

According to a first example embodiment, the gas diversion means can comprise a ramp shape on the lower profile of the intake pipe. The ramp shape promotes detachment of the gas flow in the intake pipe and sends it to the upper part of the intake pipe, therefore to the upper part of the cylinder so as to maximize the aerodynamic tumble type motion of the gas.

According to a second example embodiment (that can be combined with the first one), the gas diversion means can comprise a convergence of the flow cross-section near the valve calibration part. In other words, the flow cross-section of the intake pipe decreases at its end close to the valve calibration part. This convergence causes a gas flow acceleration that promotes aerodynamic gas motion and filling.

According to a third example embodiment (that can be combined with the first and/or the second one), the gas diversion means can comprise an inclination of the intake pipe. This intake pipe inclination can be defined by an angle β of tangent to the point of intersection of the intake pipe with the calibration part ranging between 0° and 45°. This inclination can be coupled to the slope of the upper part of the combustion chamber of the cylinder. The inclination of the intake pipe allows the gas flow entering the cylinder to be inclined so as to generate an aerodynamic tumble type motion of the gas. For example, an optimization of the aerodynamic tumble type motion of the gas can be obtained by a tangency between angle β and the angle of the slope of the upper part of the combustion chamber.

According to an aspect of the invention, the gas intake device can be of siamese type. In other words, the intake pipe comprises one inlet and two outlets directed at the cylinder, each outlet comprising an intake valve and an intake valve calibration part. Each outlet has the angular characteristics defined for generating an aerodynamic swirl type gas motion. This type of intake device, suited to cylinders with two intake valves, allows the design of the intake plenum (the intake plenum is the volume upstream from the intake pipes) to be simplified.

According to an aspect of the invention, although the gas diversion means only consist of the shape of the intake pipe, the compatibility with active or passive gas diversion elements such as intake masks is guaranteed. Thus, the intake device can further comprise an intake mask formed in the combustion chamber. An intake mask is understood to be specifically machined in the combustion chamber, close to the intake valve seats, thus allowing to block the passage over part of the flow cross-section of the intake pipe at the seat, so as to accelerate the gas flow and thereby increase the turbulence in the combustion chamber.

According to a feature of the invention, the flow cross-section of the intake pipe can have a substantially rectangular shape, with rounded corners. In this case, the intersection of the intake pipe and of the valve calibration part consists of four edges: one on the intrados side, one on the front face and two lateral ones.

According to an example of this embodiment, the rectangular flow cross-section of the intake pipe at the intersection with the valve calibration part is inclined with respect to the direction of the fire face. In other words, none of the edges of the rectangular flow cross-section is parallel or perpendicular to a direction parallel to the fire face.

Figure 2:
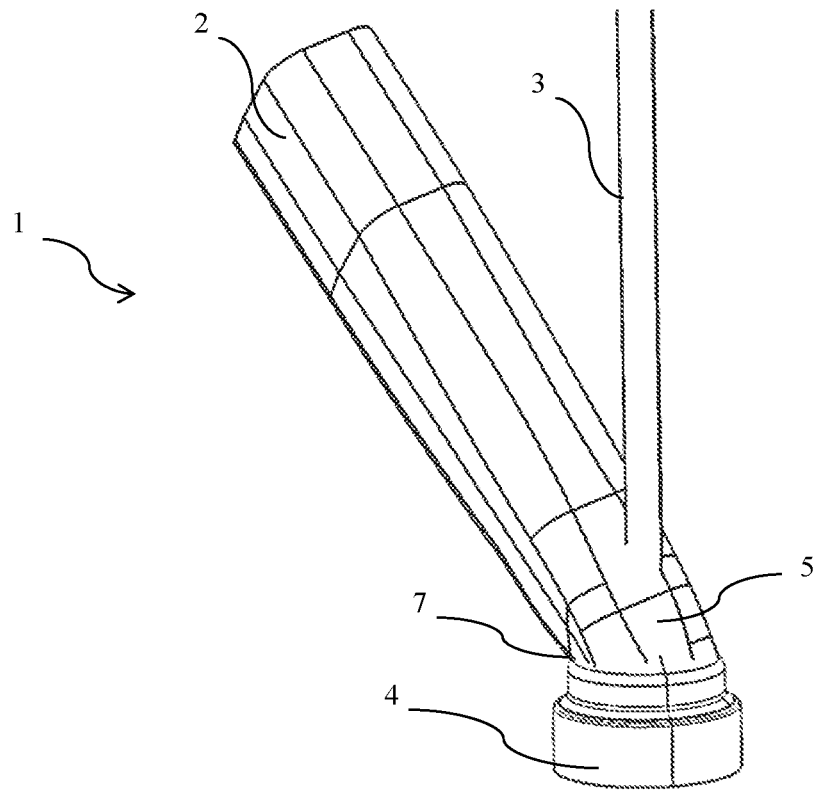
FIG. 2 illustrates a gas intake device according to an embodiment of the invention in a three-dimensional view.

FIGS. 1 and 2 schematically illustrate, by way of non limitative example, an intake device 1 according to an embodiment of the invention. FIG. 1 is a side view and FIG. 2 is a three-dimensional view of intake device 1. Intake device 1 comprises an intake pipe 2, a valve 3 arranged in the intake pipe and a calibration part 4 for the intake valve. The end of intake valve 3 allowing passage of the gas when open is not shown.

Intake device 1 further comprises gas diversion means for generating an aerodynamic gas motion within the cylinder, in a direction perpendicular to the axis of the cylinder (aerodynamic tumble type motion of the gas). These gas diversion means comprise a convergence 5 of the flow cross-section of intake pipe 2 close to valve calibration part 4. This convergence 5 corresponds to a reduction in the flow cross-section close to valve calibration part 4. Furthermore, the gas diversion means comprise a ramp 6 consisting of the lower profile of intake pipe 2. Besides, the gas diversion means comprise the inclination of intake pipe 2 at an angle β, in a direction XX of tangent to the point of intersection of the intake pipe with the calibration part, and a horizontal direction AA.

This figure also shows a line FF belonging to the plane of the fire face. Direction AA is parallel to line FF.

The intersection between intake pipe 2 and calibration part 4 at the intrados of the intake pipe is denoted by reference 7.

Figures 3A, 3B:
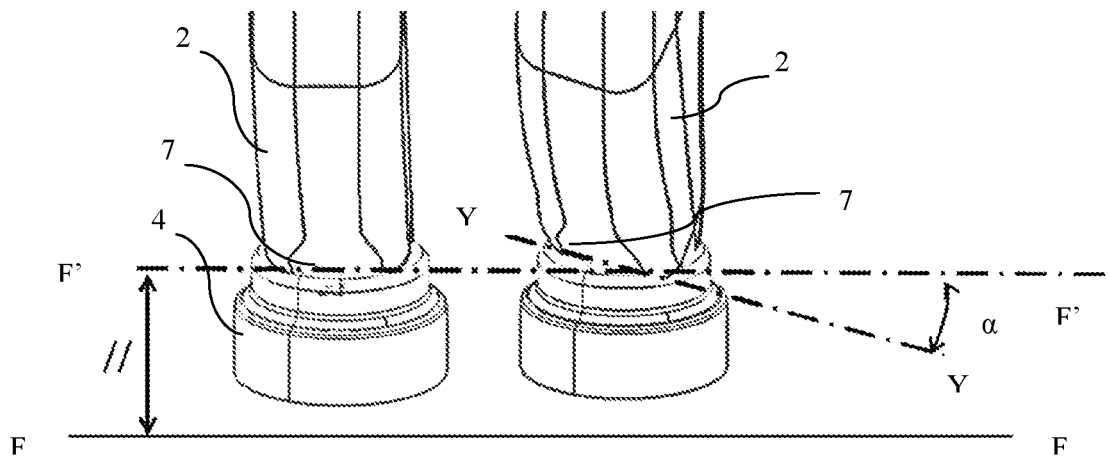
FIGS. 3a and 3b are views of the intrados of a gas intake device according to the prior art and according to the invention respectively.

FIGS. 3a and 3b schematically illustrate, by way of non-limitative example, views of the intrados (lower face) of the gas intake device. FIGS. 3a and 3b are in a plane perpendicular to the fire face. FIG. 3a corresponds to a device according to the prior art having only gas diversion means for generating an aerodynamic tumble type motion of the gas. FIG. 3b corresponds to a device according to the invention with gas diversion means for generating an aerodynamic tumble type motion of the gas and, at the intrados, an inclination of the intersection between the intake pipe and the valve calibration part.

In these figures, line FF illustrates the plane of the fire face (defined by the cylinder) and direction F' F' is a line belonging to a plane parallel to fire face FF passing through a point of intersection between intake pipe 2 and intake valve calibration part 4.

According to the prior art illustrated in FIG. 3a, intersection 7 between intake pipe 2 and intake valve calibration part 4 merges with line F'F'.

On the other hand, according to the invention illustrated in FIG. 3b, intersection 7 between intake pipe 2 and intake valve calibration part 4 is carried by a generatrix of axis YY inclined at an angle α with respect to line F'F'. This angle α ranges between 5° and 45°. It can be seen in FIG. 3b that this inclination generates a slight rotation of intake pipe 2, which has a substantially rectangular flow cross-section.

The invention also relates to an assembly comprising a cylinder of an internal-combustion engine and an intake device according to one of the variants or variant combinations described above.

Furthermore, the present invention relates to an internal-combustion engine comprising at least one cylinder, each cylinder being provided with:
- at least one intake device according to one of the variants or variant combinations described above, for supplying gas to the cylinder,
- at least one exhaust device for discharging the burnt gas from the cylinder, the exhaust device being advantageously equipped with an exhaust valve,
- a piston having a reciprocating rectilinear translational motion in the cylinder in order to generate mechanical energy from the combustion (by rotation of a crankshaft),
- fuel injection means, to generate combustion.

According to an embodiment, the fuel injection means can be direct injection means, i.e. the fuel injection means are directly arranged in the cylinder.

Alternatively, the fuel injection means can be indirect injection means, i.e. the fuel injection means are arranged in the intake device.

According to an implementation of the invention, the internal-combustion engine is a spark-ignition engine. In this case, the engine further comprises at least one plug for generating combustion of the gas/fuel mixture.

Alternatively, the internal-combustion engine is a compression-ignition engine. In this case, the engine comprises no plug for generating combustion of the gas/fuel mixture.

According to an aspect of the invention, when the cylinders comprise two intake pipes, these two pipes can be identical and parallel with respect to the median plane of the combustion chamber.

In a variant, the cylinders can be supplied with gas by a siamese intake device.

Figure 6:
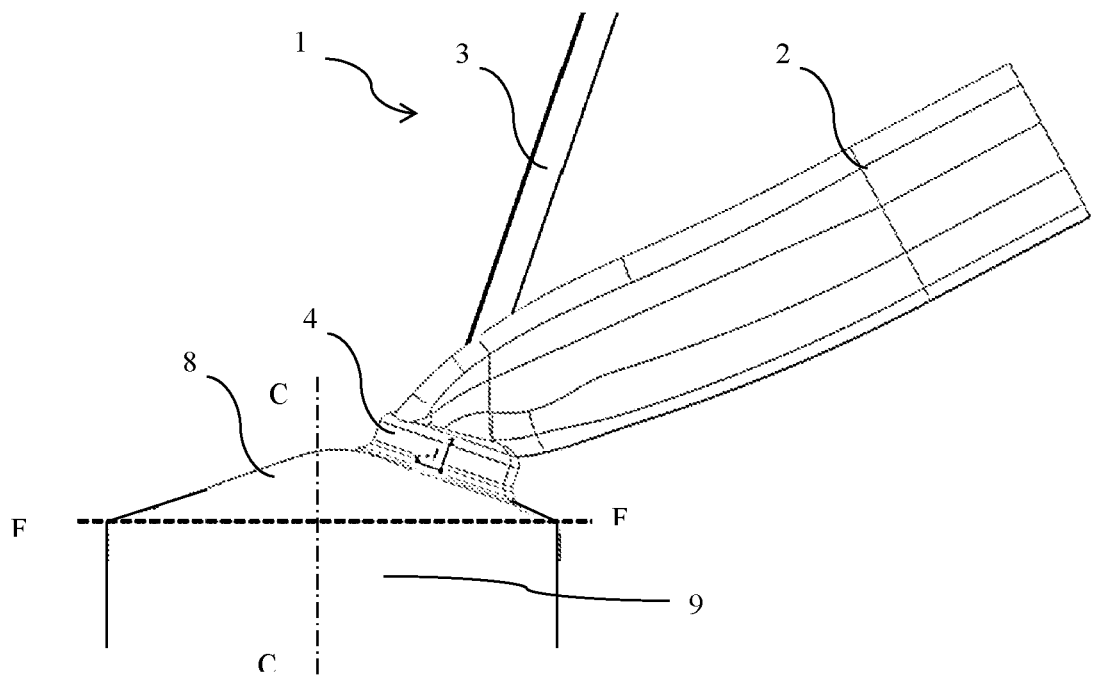
FIG. 6 illustrates a cylinder of an internal-combustion engine according to an embodiment of the invention.

FIG. 6 schematically illustrates, by way of non-limitative example, a partial view of a cylinder of an internal-combustion engine according to an embodiment of the invention. Cylinder 9, in which a piston (not shown) moves, comprises a combustion chamber 8. An intake device 1, in particular valve calibration part 4, is arranged in combustion chamber 8. An exhaust device (not shown) is also arranged in combustion chamber 8.

The axial direction of cylinder 9 is denoted by CC. This figure also shows fire face FF, which is perpendicular to axis CC, fire face FF corresponding to the lower part of the cylinder head (not shown) of the internal-combustion engine.

Intake device 1 is identical to the intake device of FIGS. 1, 2 and 3b, and it notably comprises an intake pipe 2, a valve 3 and a valve calibration part 4.

Moreover, the present invention relates to the use of an internal-combustion engine according to one of the variants or variant combinations described above in a Miller cycle or an Atkinson cycle.

The Miller cycle is a thermodynamic cycle characterized by an intake valve(s) closure before the bottom dead center of the piston during the intake phase. This allows to have increased work recovery, in addition to cooling of the charge admitted. The intake device according to the invention is particularly suited for use in a Miller cycle over a wide operating range, thanks to the generation of an aerodynamic swumble type motion of the gas.

The Atkinson cycle is the standard thermodynamic cycle used in variable-combustion engines.

The internal-combustion engine according to the invention can be used in the field of embedded applications, such as road, sea or air transport, or in the field of stationary installations such as a generator set.

COMPARATIVE EXAMPLES

The features and advantages of the intake device according to the invention will be clear from reading the comparative examples below.

For these examples, the characteristics of an internal-combustion engine equipped with an intake device according to the prior art, with only an aerodynamic tumble type motion of the gas (corresponding to FIG. 3a), are compared with the same internal-combustion engine equipped with an intake device according to the invention and having an aerodynamic swumble type motion of the gas (corresponding to FIG. 3b). For this example, the value of angle α is 15°.

Figure 4:
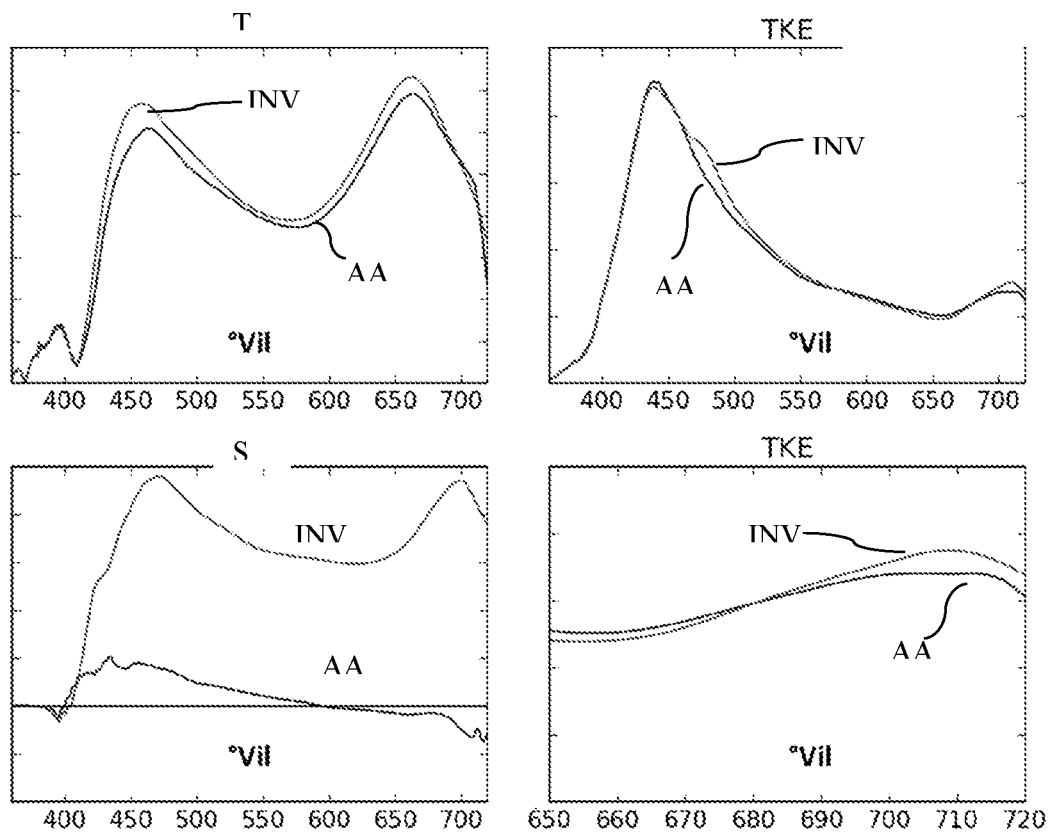
FIG. 4 illustrates curves of the tumble number, the turbulent kinetic energy (TKE), the swirl number within the context of a standard law for an intake device according to the prior art and for an intake device according to an embodiment of the invention.

FIG. 4 shows the curves of the tumble number T (top left), of the turbulent kinetic energy TKE (top right) and of the swirl number S (bottom left) as a function of the crank angle ° Vil for a part of the engine cycle from the intake bottom dead centre (360°) to the compression top dead centre (720°). The bottom right figure illustrates turbulent kinetic energy TKE for a reduced angular range zone of crank angle ° Vil close to the combustion that takes place after the compression top dead centre (720° crank angle). The tumble number in a direction x is defined as the ratio of the angular speed of the gas around the centre of mass in direction x (direction perpendicular to the cylinder axis) to the crankshaft angular speed. The swirl number is defined as the ratio of the angular speed of the gas around the centre of mass in the direction of the cylinder axis to the crankshaft angular speed. The tumble number and the swumble number are dimensionless numbers.

FIG. 4 relates to a standard cycle. In these figures, the curves corresponding to the internal-combustion engine equipped with an intake device according to the prior art are denoted by AA, and the curves corresponding to the internal-combustion engine equipped with an intake device according to the invention are denoted by INV.

The turbulent kinetic energy TKE represents the amount of energy "entrapped" in the air mass.

It is noted in these figures that the two intake devices allow an aerodynamic tumble type motion to be generated (high tumble number T). Furthermore, it is noted that swirl number S is much higher for the intake device according to the invention INV. Therefore, the inclination of the intersection between the intake pipe and the calibration part effectively allows an aerodynamic swirl type motion to be generated. The device according to the invention thus effectively allows an aerodynamic swumble (tumble and swirl) type motion to be generated. Besides, it is noted that the intake device according to the invention provides a turbulent kinetic energy (TEK) gain in relation to the prior art, by allowing an increase in this turbulent energy before combustion.

Figure 5:
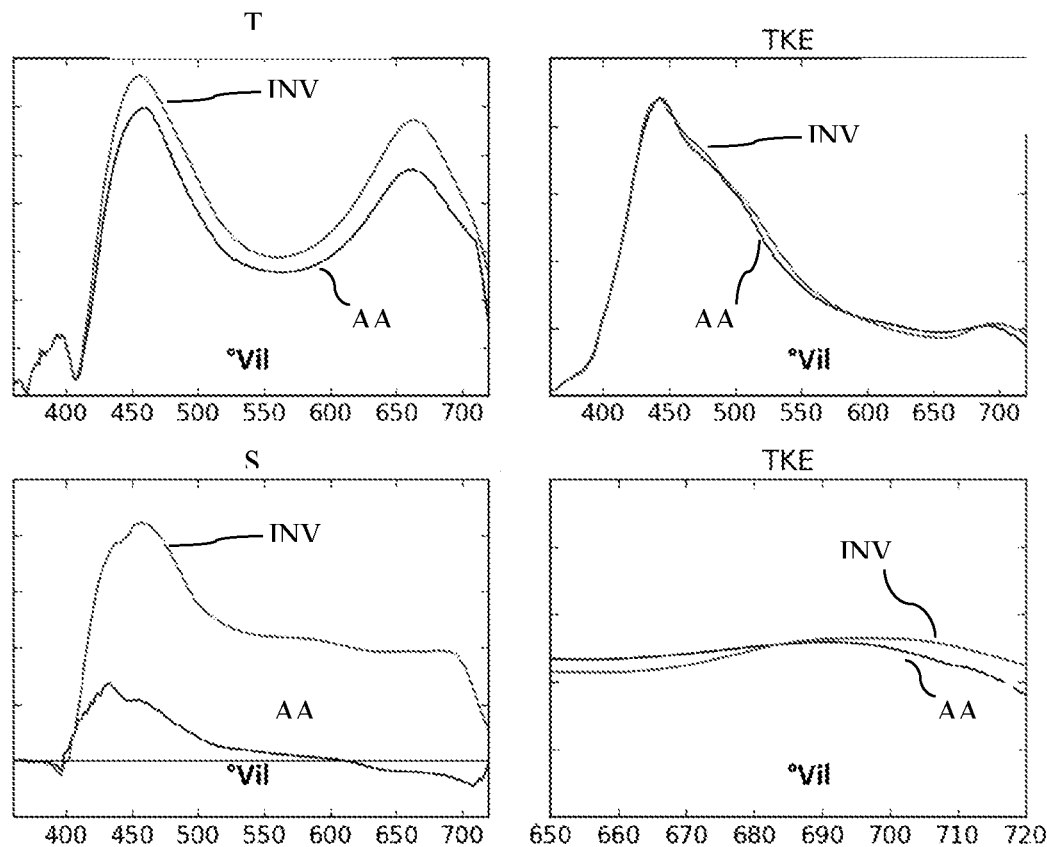
FIG. 5 illustrates curves of the tumble number, the turbulent kinetic energy (TKE), the swirl number within the context of a Miller law for an intake device according to the prior art and for an intake device according to an embodiment of the invention.

FIG. 5 shows the curves of tumble number T (top left), of turbulent kinetic energy TKE (top right) and of swirl number S (bottom left) as a function of the crank angle ° Vil for a part of the engine cycle from the intake bottom dead centre (360°) to the compression top dead centre (720°). The bottom right figure illustrates turbulent kinetic energy TKE for a reduced angular range zone of crank angle ° Vil close to the combustion that takes place after the compression top dead centre (720° crank angle). FIG. 5 concerns a Miller cycle. In these figures, the curves corresponding to the internal-combustion engine equipped with an intake device according to the prior art are denoted by AA, and the curves corresponding to the internal-combustion engine equipped with an intake device according to the invention are denoted by INV.

It is noted in these figures that the two intake devices allow an aerodynamic tumble type motion to be generated (high tumble number T). Furthermore, it is noted that swirl number S is much higher for the intake device according to the invention INV. Therefore, the inclination of the intersection between the intake pipe and the calibration part effectively allows an aerodynamic swirl type motion to be generated. The device according to the invention thus effectively allows an aerodynamic swumble (tumble and swirl) type motion to be generated. Besides, it is noted that the intake device according to the invention provides a turbulent kinetic energy (TEK) gain in relation to the prior art, by allowing an increase in this turbulent energy before combustion.

Thus, the generation of an aerodynamic swirl type motion of the gas allows better conservation of the energy contained in the aerodynamic motion during intake of an engine cycle. Thus, the turbulence level initiating combustion is higher than in purely tumble type pipes, especially for lift laws suited to Miller cycle operation.

Significant combustion efficiency gains are obtained using intake devices according to the invention. Furthermore, the architecture of these intake devices involves no additional constraint for arrangement within a cylinder head of a single-cylinder or multi-cylinder engine, which is a significant advantage in relation to existing solutions for generating swumble.

The invention claimed is:

1. A gas intake device for a cylinder of an internal-combustion engine, the cylinder having an axis (CC), the gas intake device comprising an intake pipe, at least one intake valve arranged within the intake pipe, at least one calibration part for the intake valve arranged at one end of the intake pipe and directed at fire face (FF) of the cylinder, and means for diverting the gas so as to generate an aerodynamic motion of the gas within the cylinder about an axis substantially perpendicular to the axis (CC) of the cylinder, characterized in that, a flow cross-section of the intake pipe has a substantially rectangular shape, with rounded corners, and in that, at the intrados of the intake pipe, intersection between the intake pipe and the calibration part of the intake valve is on a generatrix (YY) forming an angle $\alpha$ ranging between 5° and 45° with respect to a plane (F'F') parallel to the fire face (FF) of the cylinder passing through a point of intersection between the intake pipe and the calibration part in order to twist the end of the intake pipe.

2. An intake device as claimed in claim 1, wherein the angle $\alpha$ ranges between 10° and 20°.

3. An intake device as claimed in claim 1, wherein the means for diverting the gas consist of the shape of the intake pipe.

4. An intake device as claimed in claim 1, wherein the means for diverting the gas comprise a ramp shape on the lower profile of the intake pipe.

5. An intake device as claimed in claim 1, wherein the means for diverting the gas comprise a convergence of the flow cross-section of the intake pipe near the calibration part of the valve.

6. An intake device as claimed in claim 1 wherein the means for diverting the gas comprise an inclination of the intake pipe defined by an angle $\beta$ between a tangent to the intake pipe at the point of intersection of the intake pipe with the calibration part and a direction (AA) parallel to the fire face (FF) ranging between 0° and 45°.

7. An intake device as claimed in claim 1, wherein the intake pipe comprises two gas outlets opening into the cylinder and two intake valves.

8. An internal-combustion engine comprising at least one cylinder provided with at least one intake device as claimed in claim 1, at least one exhaust device and fuel injection means.

9. An internal-combustion engine as claimed in claim 8, wherein the fuel injection means are arranged in the cylinder.

10. An internal-combustion engine as claimed in claim 8, wherein the fuel injection means are arranged in the intake device.

11. Use of an internal-combustion engine as claimed in claim 8 for a Miller cycle or an Atkinson cycle.

12. A method of operating of an internal-combustion engine, comprising operating the internal-combustion engine as claimed in claim 8 in a Miller cycle or an Atkinson cycle.

13. An intake device as claimed in claim 1, wherein the angle $\alpha$ ranges between 13° and 17°.

* * * * *